(12) United States Patent
Phang et al.

(10) Patent No.: US 6,437,876 B1
(45) Date of Patent: Aug. 20, 2002

(54) METHOD AND APPARATUS FOR IMAGE SCALING DURING PRINTING

(75) Inventors: Soon Kian Phang; Hou Keet Lye, both of Singapore (SG)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/162,292

(22) Filed: Sep. 29, 1998

(51) Int. Cl.[7] ................................................ G06K 15/00
(52) U.S. Cl. ........................................................ 358/1.2
(58) Field of Search ........................... 358/1.1, 1.2, 1.11, 358/1.15, 1.13, 1.6, 1.16, 1.17, 1.18, 504, 527, 521, 532

(56) References Cited

U.S. PATENT DOCUMENTS 5,737,501 A * 4/1998 Tsanekawa ................. 395/102
6,231,246 B1 * 5/2001 Takeo et al. ................ 395/102

* cited by examiner

*Primary Examiner*—Arthur G. Evans

(57) ABSTRACT

In a computing system where there is more than one printer, a user first formats an image to fit a first printable area for a first medium on a first printer. This image when printed with the same format on a second printer on a medium with a smaller printable area will result in a clipped image. A printer system is modified to include a method to determine a scaling factor. The printer system uses this scaling factor to convert dimension-related information in a set of print data which defines the original image. The resultant print data after conversion is used to print an image on the second printable area. This image has a format which is proportional to the format of the original image.

22 Claims, 3 Drawing Sheets

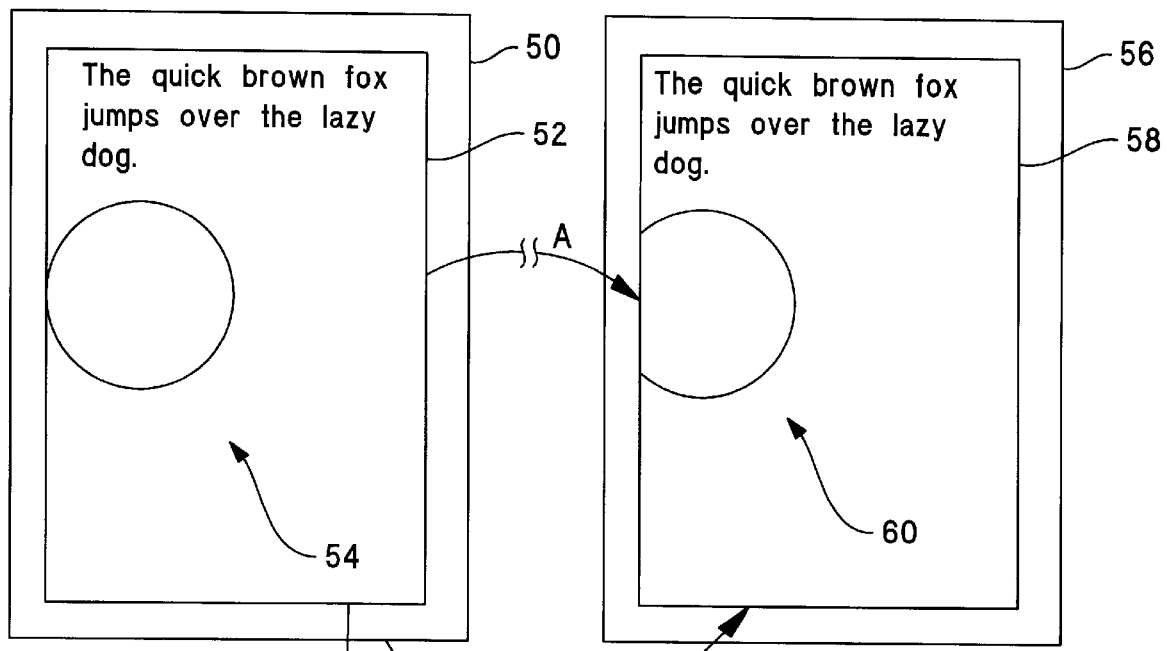
*Figure 2A*
*Figure 2B*
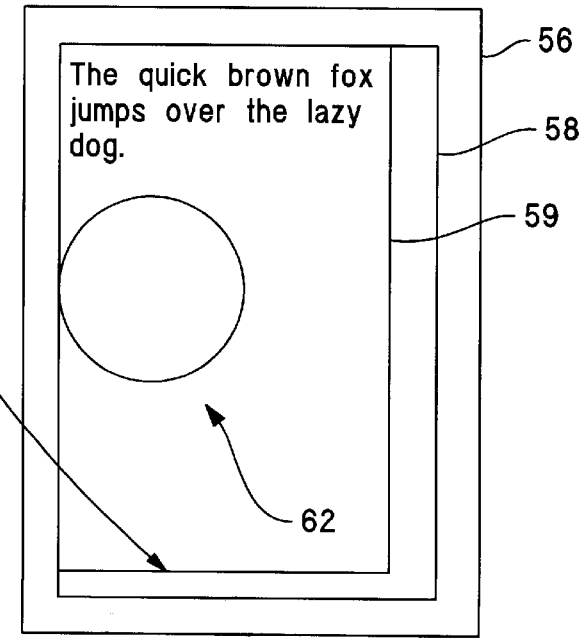
*Figure 2C*

METHOD AND APPARATUS FOR IMAGE SCALING DURING PRINTING

FIELD OF INVENTION

This invention relates to a method for printing an image to fit a printable area of a medium and more particularly for printing a reformatted image to fit a printable area of a medium on a printer wherein the image is originally formatted for an area of a medium on another printer. The reformatted image being printed on the printable area with a format proportional to that of the original image.

BACKGROUND

Works produced on a computer usually result in hard copies of the works being made on a printer. The hard copies or printouts are made on standard-sized media, such as A4-size or Letter-size standard paper, on the printer. A user formats the work by performing tasks such as selecting margins, font types, font sizes, locations to position graphics and other tasks to obtain a desirable image on a computer screen. The image is said to have a particular format corresponding to the various selections. The work is represented as print data before being sent to the printer for printing. A number of components in a printing system in the computer modify and convert the print data into various data forms during printing. The printer eventually makes a reproduction of the image on a medium.

Mechanical tolerances of parts and limitations in mechanical design of a printer usually cause the printer to be unable to print to the full physical extent of a medium. In other words, the printer is unable to print to the edges of the medium. There is a border region along the edges of the medium that the printer is unable to print to. Left, right, top and bottom boundaries from the respective medium edges define the limits for printing. The area enclosed by these boundaries is known as the printable area. The area outside of this printable area on the medium is known as the unprintable area. The printable areas on a particular medium may vary from printer to printer.

A work area on a page is specified by a set of left, right, top and bottom margins. A user selects these margins by specifying the distance of these margins from the respective edges of a medium. In some applications, such as those for word processing, extra information such as headers, footers and line numbers are included on the area outside of the work area. In such applications, the work area is defined to encompass more than just the area enclosed by the specified margins. The work area in such applications is defined to cover the full extent of all the extra information added to a page. If the work area fall within the printable area of the medium, the work produced in the work area can be printed completely on the medium. If, however, the work area encroaches on the unprintable area, the part of the work which lies in the unprintable area will not be printed.

The boundaries of printer-supported media are reported to a software application when the printer is selected in the application. The application may use these boundaries to allow a user to preview the work as it would be printed on the respective media. In other words, the application offers what-you-see-is-what-you-get (WYSIWYG) capability. The application may also verify user-selected margins with the reported boundaries. This verification checks that the user-selected margins fall within the printable areas specified by the boundaries. The application presents a boundary-exceeded warning if the margins are outside of the boundaries. To ensure that the image of the work is completely printed, the user has to reformat the work.

With prices of printers becoming cheaper, it is not uncommon for commercial organizations and even individuals to own two or more printers with complementary features. For example, an organization or a user may have a laser printer and an ink jet printer. The user may use the laser printer for faster and higher resolution printing and the ink jet printer for making color printouts. The laser printer may also be used to print draft copies of work produced on a computer and the ink jet printer used to produce a final color copy. These printers usually have different printable areas. These printable areas differ in size and position on a page. The differences pose a problem during printing. As an example, consider a scenario where a user selects a laser printer as a default printer for an application. The user chooses margins which are equal to the boundaries when working on a letter-sized medium on this laser printer. In between iterations of the work, the user makes hard copies of the work on the laser printer. The laser printer faithfully reproduces hard copies of the work as viewed on the computer screen. The user then decides that the work is satisfactory and wants to print a formal color copy on the ink jet printer. The user then selects the ink jet printer without changing the default margins set for the laser printer. Assume that the ink jet printer has a printable area which is smaller or of a different position as compared to the laser printer. The selection of the ink jet printer results in an error message which reports that one or more margins of the page encroaches on the unprintable area of the ink jet printer. The user is warned of this encroachment and prompted to decide whether to have the margins modified to that equal to the boundaries of the medium on the ink jet printer or to ignore the warning. If the user chooses to modify the margins, the format of the work as viewed on the computer screen and subsequently the image for printing will change accordingly. If the user ignores the warning, the image will be clipped when printed. Parts of the image falling outside the printable area will not be printed. Not only is information lost in such an incomplete printout, the format of the original image is also lost. To get a printout without any loss of information, the user can reset the margins of the page to fall on or within the printable area of the ink jet printer. This may have the desirable effect of retaining all information but the format of the original image is still lost. This change in format may be unacceptable to a user. The user will have to reformat the work to retain a look of the work which is close to the original work. These modifications are known to be very cumbersome.

From the above, there is therefore a need for a method of printing a reformatted version of an image, which is originally formatted for a first area, on a printable second area of a printer such that the reformatted image has a format proportional to that of the original image.

SUMMARY

In accordance with the preferred embodiment of the invention, a method is provided to reformat an image to fit a printable area on a medium. More specifically, the image is originally formatted to fit a first area of a medium. This first area may be an entire surface of a medium, a printable area of a medium or an area defined by margins anywhere on the medium. The print data defining the original image is then scaled to give a reformatted image which fits a printable second area on a medium on a printer. The first and second areas are different. A scaling factor is obtained using dimensions which specify the first area and the printable second area. This determination of the scaling factor is performed in a printer driver according to the preferred embodiment. Also according to the preferred embodiment, the actual scaling of print data is performed by an application. If the first area is a printable area of a medium on a first printer, the reformatting of image allows the second printer to emulate the first printer in printing the image.

In one aspect of the embodiment, medium dimensions and dimensions which specify the printable second area are used to determine the scaling factor.

Formatting an image by scaling the original print data allows the formatted image to have a format proportional to that of the original image.

BRIEF DESCRIPTION OF DRAWINGS

The invention will be better understood with reference to the drawings, in which:

FIGS. 2A, 2B and 2C are explanatory diagrams for describing computing of a scaling factor. FIG. 2A shows an image formatted to fit a first printable area. FIG. 2B shows the image in FIG. 2A printed clipped on a second printable area. FIG. 2C shows the image in FIG. 2A reformatted to fit into the second printable area in FIG. 2B.

DETAILED DESCRIPTION OF THE PREFERRED EMBODIMENTS

Figure 1:
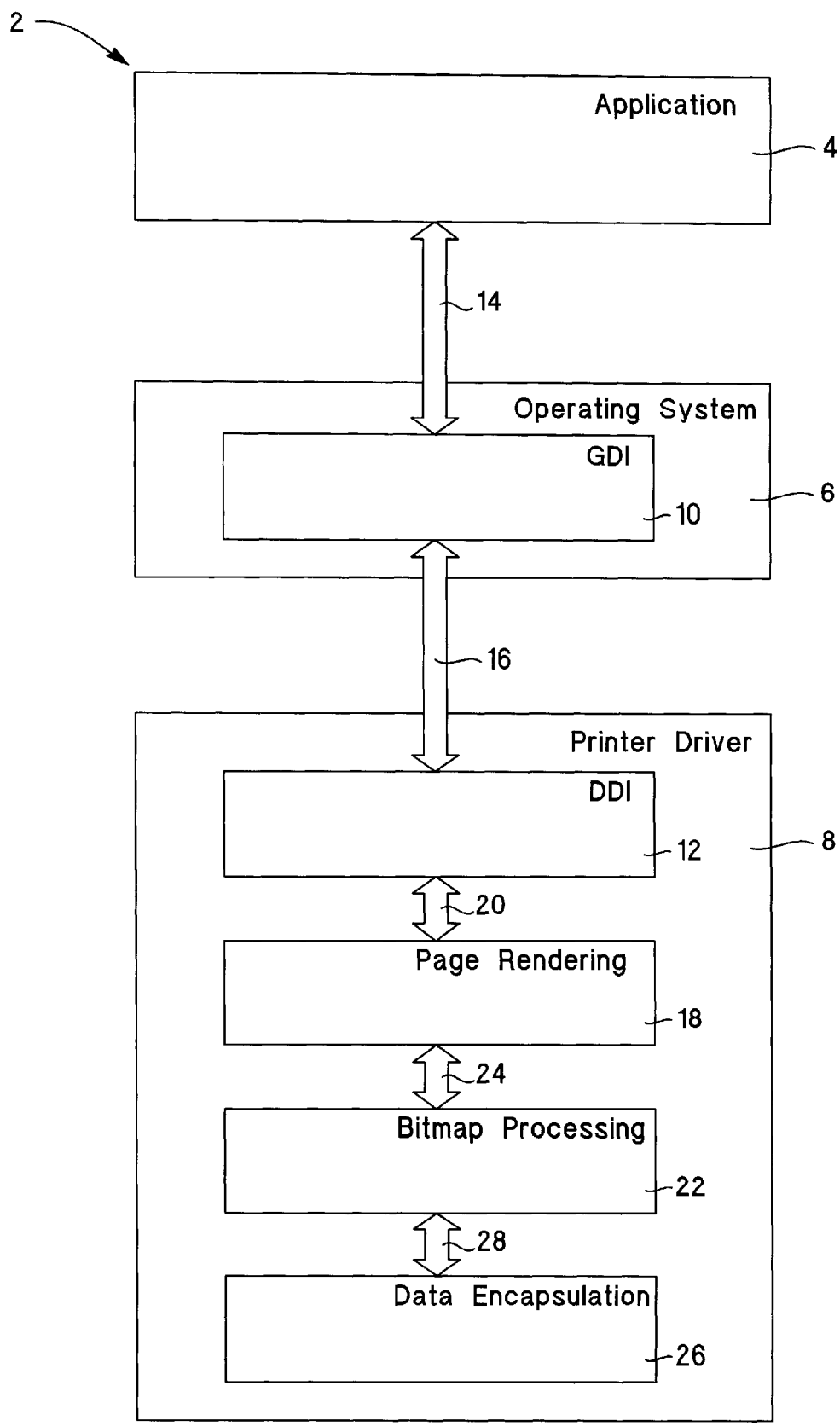
FIG. 1 is a schematic diagram of software components of a printing system in a computer.

The software components 2 in a printing system are first described with reference to FIG. 1. This description of the components sets the context for describing the preferred embodiment according to the invention. The implementation of the invention is described later by highlighting changes required in the software components in FIG. 1.

The software components are classified broadly as an application 4, an operating system (OS) 6 and a printer driver 8. The application 4 is a software that performs a specific task, for example, word processing, drawings, spread sheets and other tasks. The OS 6 controls resources such as memory and input/output devices in a computer system. The OS 6 also shields the application 4 from device-specific drivers such as the printer driver 8. The application 4 needs only to deal with the OS 6. This shielding of the application from the drivers makes the application less susceptible to peculiarities of the different devices.

The printer driver 8 is a software component that permits a computer system to communicate with a printer (not shown). In most cases, the driver 8 typically performs only the higher-level data translation. This higher-level printer driver 8 then relies on lower-level drivers (not shown) to actually send print data to the printer.

A sequence of printing related commands is next described in the context of the Windows 95 OS (Windows 95 is a proprietary OS developed by Microsoft Corp., Redmond, Wash., U.S.A.) At the start of a printjob, the application 4 makes an application programming interface (API) call to a Graphical Device Interface (GDI) 10 in the OS to request for service from the printer. The GDI 10, which implements and supports the API call, translates the API call into an appropriate Device Driver Interface (DDI) 12 call to the printer driver. The printer driver 8 on receiving the API call carries out an instance and page initialization to service the request. Upon successful initialization, the printer driver 8 returns an initialization successful result to the application indicating the ability to service the request. The initialization message carries a unique identifier of the instance. This unique identifier is termed a handle. During the printjob, further transfers of messages between the software components will use this handle to identify the instance.

Upon receiving the initialization successful result, the application 4 begins to send print data, page by page, to the GDI 10 as shown by an arrow 14. The print data comprises GDI primitives in the form of text, bitmaps, lines, circles and other data forms. The following are some examples of GDI primitives:

1. DrawText (hdc, "Hello World", −1, {10,10,200,25}, 0)
   This DrawText primitive draws a line of text, "Hello World", in a rectangle bounded by two points given by pixel coordinates (150, 150) and (600, 300). A corner of a page is usually taken to be a reference point with pixel coordinates of (0, 0). The first parameter, hdc, indicates the handle in the printer driver to be used to process this GDI primitive. The parameter, −1, indicates that a default carriage return is to be used. The last parameter, 0, indicates left justification of the line of text.
2. Ellipse (hdc, 500, 500, 800, 800)
   This Ellipse primitive draws a circle in a square area bounded by horizontal and vertical lines drawn over the two points (500, 500) and (800, 800).

These GDI primitives and parameters are not to be construed as complete. The GDI primitives are given to illustrate the pixel coordinate system which may be used to specify how text and graphics are to be printed. One can refer to the Microsoft Software Development Kit (SDK) for a complete and fuller description of GDI primitives.

Upon receiving the GDI primitives from the application 4, the GDI 10 translates the GDI primitives into DDI primitives. This translation may or may not be a one-to-one mapping. The GDI sends the DDI primitives to the printer driver 8 as shown by an arrow 16.

Up to this point in this description, all software components which are changed to implement the preferred embodiment according to this invention have been described. The rest of the description that follows is a brief description of components which perform subsequent processing of the print data to prepare the print data for printing on a printer. It should be noted that the accompanying description is included for completeness and there may be variations in the names of components and the sequence of processing that are well known to those skilled in the art.

In the printer driver 8, the DDI 12 performs pre-processing on the DDI primitives before calling a Windows Color Printing System (not shown) to convert the pre-processed DDI primitives into Render Primitive Lists (RPLs). These RPLs are essentially lists of rendering primitives for different portions of the page. Each list of rendering primitives is used to create an intermediate image of a portion of the page. The intermediate image is rendered to give the eventual image a realistic look using color and shading.

The DDI 12 passes these RPLs to a page rendering component 18, as shown by an arrow 20. This page rendering component 18 renders the RPLs into band bitmaps. The page rendering component 18 next passes the rendered bitmaps on to a bitmap-processing component 22, as shown by an arrow 24. This bitmap processing component 22 performs such enhancing functionalities as halftoning, sharpening, edge smoothing, color-black interaction controlling and other functionalities well known to those skilled in the art for converting bitmaps into a form suitable for the printer. The bitmap-processing component 22 passes the processed bitmaps to a data encapsulation component 26, as shown by an arrow 28. The data encapsulation component 26 then encapsulates the processed bitmaps into a printer understandable language, such as the Printer Command Language (PCL). Finally, an input/output (I/O) component (not shown) sends the PCL commands to the printer for the printer to print the image from the PCL commands.

An illustrative method of determination of a scaling factor is described next with reference to FIGS. 2A, 2B and 2C. FIG. 2A shows a page 50 with a first printable area 52 suitable for printing an image 54 on a first printer. FIG. 2B shows a page 56 of a similar size as the page 50 but having a second printable area 58 which is smaller than the first printable area 52. When the image 54 is printed on the second printable area 58, a printout showing a clipped image 60 will be obtained. FIG. 2C shows a reformatted version 62 of the image 54 when printed on the second printable area 58 according to the preferred embodiment. Reformatting of the original image is achieved by scaling information in a set of print data that defines the original image by a scaling factor. Ideally, a smaller scaling factor corresponding to the difference between the two printable areas 52, 58 should be used to scale the print data. An arrow A straddling FIGS. 2A and 2B indicates this ideal scaling. However due to the lack of knowledge of the first printable area when computing the scaling factor in the preferred embodiment, the print data which defines the image 54 is scaled by a larger and worst case amount corresponding to the difference in size between the page 50 and the printable area 58. An arrow B1 straddling FIGS. 2A and 2B indicates this worst case scaling. With a scaling factor corresponding to this worst case scaling, the original image 54 is reformatted to fit into an area 59 within the second printable area 58.

Figure 3:
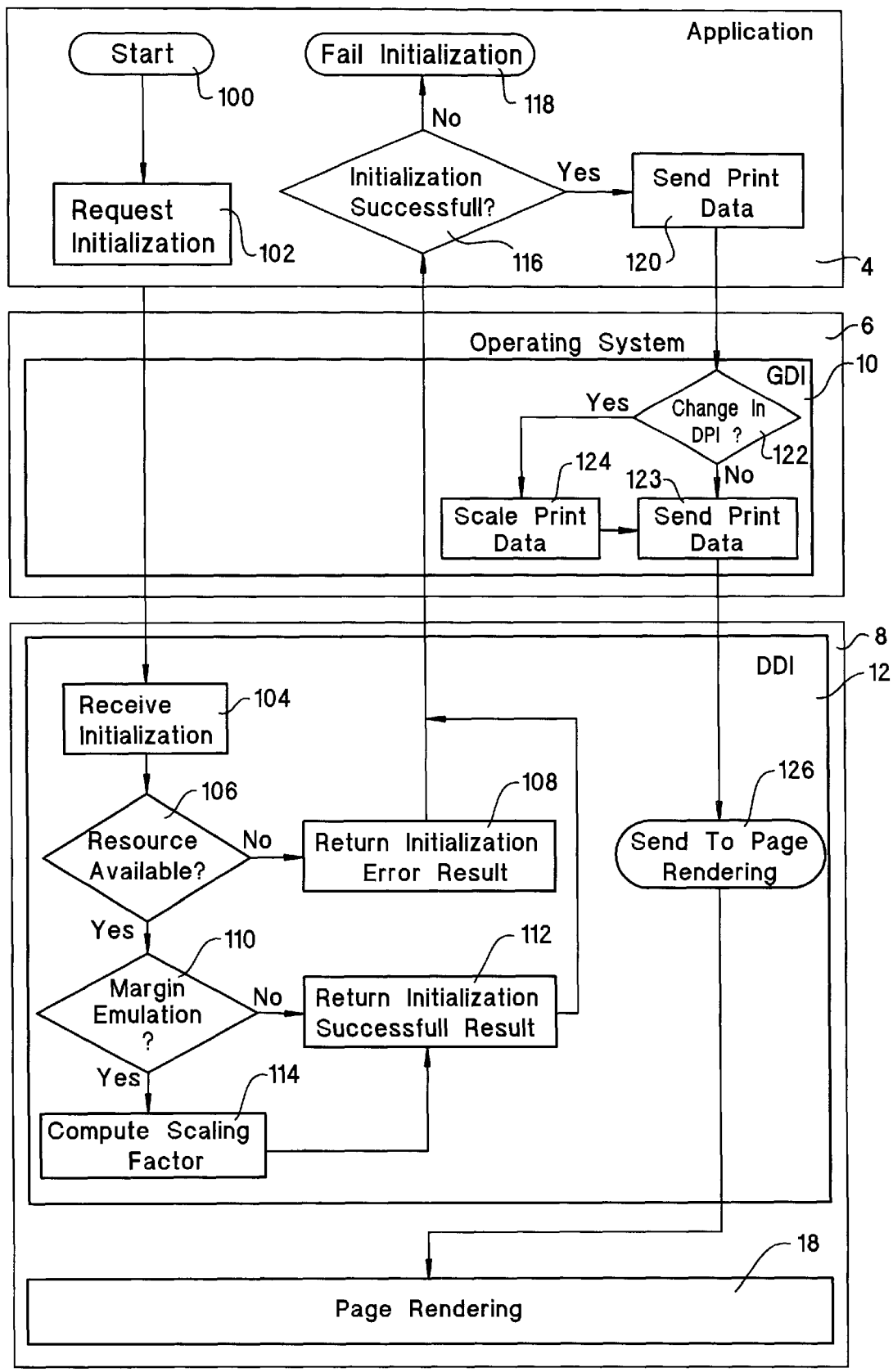
FIG. 3 is a flowchart illustrating the sequence of operation and method for reformatting an image by scaling a set of print data which defines the image so that the reformatted image fits a printable area of a medium in accordance with the present invention. The sequence is shown in the context of the software components in FIG. 1.

The preferred embodiment of the invention is now described in detail in the context of the printing system in FIG. 1 for printing a reformatted image as explained in FIGS. 2A, 2B and 2C. Although the preferred embodiment is described using the example of the scaling down or reduction in size of an image, the invention should not be construed to be limited as such. The invention will work equally well with scaling up or enlarging an image. FIG. 3 shows a sequence of operation and method for scaling print data to reformat an image to fit a printable area of a medium. The sequence starts in a START step 100. In this START step 100, an application 4 prepares print data for printing. The application 4 also provides the user an interface to a printer driver 8 to allow the user to select a margin emulation feature. The selection of the margin emulation feature sets a flag in the printer driver 8 to prime the printer driver to compute a scaling factor when the printer driver 8 next receives a request to service a printjob.

The sequence proceeds next to a CREATE CONTEXT step 102, where the application 4 makes an initialization request. The application calls a function such as the CreateDC API call to make the request. Print parameters such as the printer driver to initialize, dots per inch (DPI) and the size of a medium are passed to the GDI 10 through the API call. The size of a medium is usually defined as a width and a length of the medium. The application selects the DPI based on a desired print quality and the selected medium type. The GDI 10 translates the initialization request to a DDI request and sends the DDI request to the printer driver 8.

The sequence next proceeds to a RECEIVE INITIALIZATION step 104, where the DDI 12 receives the DDI request. The sequence proceeds to a RESOURCE AVAILABLE? step 106. In this step 106, the DDI 12 checks if resources are available in the printer driver 8 to service the request. If resources are not available as determined in the RESOURCE AVAILABLE? step 106, the scaling sequence proceeds to a SEND INITIALIZATION ERROR RESULT step 108 where the printer driver 8 sends an initialization error result to the requesting application 4. If resources are available as determined in the step 106, the initialization sequence proceeds to a EMULATION REQUESTED? step 110. In this step 110, the printer driver 8 checks the status of the flag. If the flag is clear as determined in the EMULATION REQUESTED? step 110, the sequence proceeds to a SEND INITIALIZATION SUCCESSFUL RESULT step 112 in which the printer driver 8 returns an initialization successful result to the requesting application 4. If the flag is set as determined in the EMULATION SUCCESSFUL? step 110, the initialization sequence proceeds to a COMPUTE SCALING FACTOR step 114. In this step 114, the printer driver 8 computes a scaling factor based on the medium size 50 (FIG. 2A) and supported boundaries for the selected medium size 58 (FIG. 2B). As mentioned earlier, this computing a worst case scaling factor arises from the fact that margins 58 for the medium 56 is not available at this particular instant in the sequence. The worst case scenario of zero margins on the medium 50 is assumed to compute the scaling factor. The printer driver 8 first computes the difference between the width of the medium 50 and the width of the second printable area 58. The printer driver 8 next computes a first reduction factor by dividing the difference by the width of the medium 50. Similarly, the printer driver computes a second reduction factor by making similar calculations using the length of the medium 50 and the length of the second printable area 58. The printer driver 8 obtains the scaling factor by subtracting the larger of the two reduction factors from a value of one.

Alternatively, the determination of the scaling factor can be in the form of a lookup table. Since zero margins on a medium constitutes a work area equivalent to the dimensions of the medium, predetermined scaling factors may be made available to scale different media sizes to a printable area of a particular medium.

Using the scaling factor, the printer driver 8 calculates a new DPI value by multiplying the scaling factor with the original DPI selected by the application. Also in this step 114, the printer driver computes a new medium width and length by multiplying the scaling factor with the original medium width and length. The sequence next proceeds to the SEND INITIALIZATION SUCCESSFUL RESULT step 112 where the printer driver 8 returns an initialization successful result to the application 4 via the OS 6. The new DPI and the new medium dimensions are reported to the application 4.

The sequence next proceeds to an INITIALIZATION SUCCESSFUL? step 116 in the application 4. If the initialization is unsuccessful as determined in the INITIALIZATION SUCCESSFUL? step 116, the sequence ends in a FAIL INITIALIZATION step 118. If the initialization is successful as determined in the INITIALIZATION SUCCESSFUL? step 116, the sequence proceeds to a SEND PRINT DATA step 120, where the application sends print data to the GDI 10 in the OS 6.

The application 4 recognizes a change in the DPI value as reported by the printer driver 8. Some applications, such as the PhotoShop application, uses the new DPI value to convert the print data into an appropriate form before sending the converted print data to the OS 6. Other applications, such as the Microsoft Word and Microsoft Excel applications may choose to ignore the change in the DPI value, as illustrated in the embodiment in FIG. 3.

The new medium size received from the printer driver 8 indicates to the application 4 that the medium size selected has not changed. The new medium dimensions merely synchronize the medium dimensions, in terms of number of dots, to that of the new DPI. These new dimensions are necessary so as not to cause the application 4 to reformat the original image.

The explanation of why the new medium dimensions are important is best made by way of an example. Assuming the width of the medium is 10 inches and an original DPI of 300 is selected. At this original DPI of 300 DPI, the width of the medium is represented as 3000 dots. Assuming also the second printable area 58 has a width of 9 inches. Based on the computation as described above, a scaling factor of 0.9 is obtained. The new DPI will be 0.9×300=270 DPI and the new medium width is 2700 dots. This new medium width of 2700 dots is effectively 10 inches at 270 DPI. The application 4 will think that the selected medium width has not changed. Had the medium width been left unchanged at 3000 DPI, the application will assume a paper width of 3000/270=11.11 inches is available. Some applications will automatically reformat the image to fit this new medium width. To maintain the original format of the document, it is therefore important for the printer driver 8 to report a scaled medium width and length according to the new DPI to the application 4.

After the GDI 10 receives the print data from the application 4, the sequence proceeds to a CHANGE IN DPI? step 122. If there is no change in DPI as determined in the step 122, the GDI 10 will proceed to translate and send the print data to the printer driver 8 in a SEND PRINT DATA step 123. However, if the DPI is changed as determined in the CHANGED IN DPI? step 122, the sequence proceeds to a SCALE PRINT DATA step 124. In this step 124, the GDI 10 converts dimension-related information in the print data by multiplying dimension-related parameters, such as pixel coordinates and font sizes, by the scaling factor before proceeding to translate and send the print data out to the printer driver 8 in the SEND PRINT DATA step 123. This conversion of print data results effectively in reformatting the original image. The GDI 10 computes the scaling factor from the new and original DPI values. If necessary, the GDI 10 also adjusts the pixel coordinates in the print data to seat the reformatted image in a coordinate system bounded by the second printable area 58 (FIG. 2C).

The explanation of how scaling is best made by way of another example. Assuming the same new and original DPI values as the earlier example which results in a scaling factor of 0.9. Next, assuming a horizontal one-inch line is to be printed from coordinates (300,300) to (600,300). The GDI 10 will scale the print data to define the one-inch line from coordinates (270, 270) to (540, 270). To the GDI 10, printing this scaled line from (270, 270) to (540, 270) at 270 DPI will result in a one-inch line being printed. When the scaled print data gets rendered in the printer driver 8 at 300 DPI, the 270-dot one-inch line is printed with a length of 270/300= 0.9 inch, effectively achieving a scaled line. Other print data will be scaled accordingly and the resultant image will be printed with a format which is proportional to the format of the original image to fit the second printable area 58.

After the printer driver 8 receives the print data from the GDI 10, the printer driver 8 collects all print data for a page.

As soon as all print data for a page is received, the sequence terminates in a SEND TO PAGE RENDERING step 126. The printer driver 8 is none the wiser with regard to the changed print data. The printer driver 8 subsequently renders the print data at the original DPI. The result of rendering the scaled print data at the original DPI will result in a printout that has a format proportional to that of the original image as explained above.

While the present invention has been shown and described with reference to the foregoing operational principles and preferred embodiment, it will be apparent to those skilled in the art that other changes in form and detail may be made.

As an example, the preferred embodiment is described with a user selecting a separate margin emulation feature. Another implementation is also possible. On some existing printers, a Zoomsmart feature exists where a user can print enlarged or reduced documents easily without the need to reformat the original document in the software application. This Zoomsmart feature basically reformats an image which fits one printable area to either a larger or a smaller printable area without compromising print quality. This Zoomsmart feature can be extended to support this invention. Currently, Zoomsmart allows scaling to be specified by allowing a user to select a source medium size in a "From:" field to a target medium size in a "To:" field in a dialog box type user interface. A new user selectable entry in the "From:" field may be added to the existing list of supported media sizes. This new entry basically instructs the Zoomsmart feature to use the document size as the source medium size. The Zoomsmart feature can then scale according to the preferred embodiment described above.

As a further example, in the preferred embodiment, the printer driver 8 is described to compute the scaling factor. By having the printer driver 8 compute the scaling factor, little or no change to the application software 4 is required. However, there is a drawback in this method of computing a scaling factor. Since at the point of computing the scaling factor the printer driver 8 has no notion of what the original printable area is, the printer driver assumes a worst case scenario where the print data covers the entire medium. This assumption of a worst case scenario results in over scaling. Had the printer driver known the exact printable area which the print data covers, a more accurate scaling factor could have been computed. The ideal location to compute a scaling factor is in the application, since the application knows the selected margins 52 (FIG. 2A) which the print data covers. The application can query a printer driver for the printer-supported printable area 58 (FIG. 2B) for the selected medium 56 (FIG. 2B). If there is a mismatch in the printable areas 52, 58, the application can compute an ideal scaling factor and allow the GDI 10 to reformat the image 54 according to the method described above.

The GDI 10 is also described to perform scaling of print data in the preferred embodiment. This scaling of print data could have also been performed in the application 4. The application will however have to indicate to the GDI 10 that the application 4 has already performed scaling on the print data and no further scaling of print data is required in the GDI 10.

The embodiment is also described with a first printable area 52 which is larger than a second printable area 58 and that scaling of print data is necessary to reformat an image 54 to produce a reformatted image 62 which fits the second printable area 58. It should be noted that the first printable area 52 might be smaller or of the same dimensions as the second printable area 58 but located outside of the coordinate system defined by the second printable area 58. In such a case, no scaling of print data is necessary. Only adjustments of the coordinates in the print data are required to seat the image 54 in the second printable area 58. The adjustment of coordinates is described in U.S. Pat. No. 5,316,396. The method as described in the patent can be used in conjunction with this current invention for converting print data which defines the original image to produce a resultant image which fits the second printable area 58. The patent describes a method for converting coordinates in print data for a first printable area to another coordinates adapted to print on a second printable area while changing the size of the entire image.

As yet a further example, the scaling method has been described as using a scaling factor to scale coordinates information in the print data of an image to reformat the image. This should not be construed as a limitation. The scaling factor can be used with known image processing algorithms to scale the bitmaps.

The scaling has also been described in the preferred embodiment as reducing an image in size to fit a printable area. Again, this should not be construed as a limitation. If the original printable area is smaller than a target printable area, and printing an image formatted for the source printable area on the target printable area results in an undesirable printout, the image may be scaled up using the method described above with an appropriate scaling factor that is an enlargement factor.

The preferred embodiment is also described in the context of the Microsoft OS. It should be noted that the invention works equally well on other operating systems such as the UNIX OS (UNIX OS, a proprietary operating system from AT&T Corp., Middletown, N.J.)

We claim:

1. A printing method comprising the steps of:
   generating print data defining an image which fits within a first area on a first medium;
   selecting a second medium on a specific printer for which the print data is to be sent, the selected printer structurally defining a printable area on the second medium;
   determining a scaling factor from dimensions which define the first area on the first medium and dimensions which define the printable area on the second medium;
   converting the print data using the scaling factor to produce a converted print data; and
   printing from the converted print data a reformatted image which has a format proportional to that of the original image.

2. A printing method according to claim 1, wherein the first medium and the second medium are of the same size.

3. A printing method according to claim 1, wherein the first area is defined by the size of the first medium.

4. A printing method according to claim 1, wherein the first area is defined by a printable area of the first medium which printable area is structurally defined by a previously selected printer.

5. A printing method according to claim 1, wherein the first area is defined by the full extent of the image.

6. A printing method according to claim 1, wherein all steps except the step of printing from the converted print data are performed by an application software.

7. A printing method according to claim 1, wherein the steps of generating print data and selecting the second medium are performed by an application software, the step of converting the print data is performed by an operating system and the step of determining the scaling factor is performed by a printer driver.

8. A printing method according to claim 7, further comprising a step of informing the operating system of the scaling factor determined by the printer driver.

9. A printing system according to claim 8, further comprising a step of informing the application software new dimensions of the second medium obtained by scaling original dimensions of the second medium.

10. A printing system according to claim 8, wherein the step of informing the operating system of the scaling factor comprises sending a resolution information which the operating system uses to reconstruct the scaling factor.

11. A printing method according to claim 7, further comprising a step of receiving a signal in the printer driver to enable the printer driver to determine the scaling factor.

12. A printing method according to claim 1, wherein the step of converting the print data comprises converting dimension related information in the print data using the scaling factor to produce a converted print data.

13. A printing method according to claim 12, wherein the step of converting dimension related information comprises converting information related to coordinates and font sizes in the set of print data which defines the image.

14. A printing method according to claim 12, wherein the step of converting dimension related information comprises reducing dimension related information by the scaling factor.

15. A printing method according to claim 1, wherein the step of converting the print data further comprises the steps of:
   scaling dimension related information in the print data using the scaling factor to produce a scaled print data; and
   adding an offset to dimension related information in the scaled print data to produce a converted print data.

16. A printing method according to claim 1, wherein the step of converting the print data comprises converting a bitmap which defines the original image by using the scaling factor in an image processing algorithm.

17. A print system for printing a reformatted version of an original image which is formatted to fit a first area for a first medium onto a printable area of a second medium on a specific printer, wherein the reformatted image has a format proportional to that of the original image, the print system comprising:
   an application software on which the original image is created and formatted to fit the first area, the image being defined by a set of print data for printing;
   a printer driver which determines a scaling factor from the first area and the printable area of the second medium; and
   an operating system which translates messages exchanged between the application software and the printer driver, and uses the scaling factor to convert dimension related information in the print data to produce a converted print data which is sent to the printer to print the reformatted image.

18. A program storage device readable by a computing device, tangibly embodying a program of instructions, executable by the computing device to perform the method steps for printing a reformatted version of an original image which is formatted to fit a first area for a first medium onto a printable area of a second medium on a specific printer, wherein the reformatted image has a format proportional to that of the original image, the method steps comprising:
   generating print data defining the original image which fits within the first area;

selecting the second medium on the specific printer for which the print data is to be sent;

determining a scaling factor from dimensions which define the first area and dimensions which define the printable area on the second medium;

converting the print data using the scaling factor to produce a converted print data; and printing from the converted print data the reformatted image which has a format proportional to that of the original image.

19. A printing method comprising the steps of:

generating print data defining an image which fits a first area on a first medium;

sending the print data to a printer for printing on a second medium having a printable area having at least one dimension that is smaller than a corresponding dimension of the first area;

determining a size reduction scaling factor from dimensions of the first area and the printable area;

converting the print data using the scaling factor to produce a converted print data; and printing from the converted print data a size-reduced image which has a format proportional to that of the original image to fit within the printable area without the size-reduced image appearing clipped.

20. A printing method according to claim 19, wherein the first area is defined by a printable area of the first medium, the printable area being structurally defined by a previously selected printer.

21. A printing method according to claim 19, wherein the step of converting the print data comprises the steps of:

scaling dimension-related information in the print data using the scaling factor to produce a scaled print data; and adding an offset to dimension-related information in the scaled print data to produce a converted print data.

22. A print system comprising:

an application software on which an original image is created and formatted to fit a first area on a first medium, the image being defined by a set of print data for printing on a selected second medium having a printable area that has at least one dimension that is smaller than a corresponding dimension of the first area;

a printer driver which determines a size reduction scaling factor from dimensions of the first area and the printable area ; and an operating system which translates messages exchanged between the application software and the printer driver, and uses the scaling factor to convert dimension-related information in the print data to produce a converted print data which is used to print a size-reduced image that fits within the printable area without the size-reduced image appearing clipped.

* * * * *